(12) United States Patent
Cheng et al.

(10) Patent No.: US 8,848,795 B2
(45) Date of Patent: Sep. 30, 2014

(54) APPARATUS FOR AUTO PHASE DETECTION FOR VIDEO SIGNAL AND METHOD THEREOF

(75) Inventors: Kun-Nan Cheng, Hsinchu Hsien (TW); Chih-Tien Chang, Hsinchu Hsien (TW); Chit-Keng Huang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 670 days.

(21) Appl. No.: 12/841,442

(22) Filed: Jul. 22, 2010

(65) Prior Publication Data

US 2011/0051009 A1    Mar. 3, 2011

Related U.S. Application Data

(60) Provisional application No. 61/236,893, filed on Aug. 26, 2009.

(51) Int. Cl.
*H04N 7/12* (2006.01)
*H04N 5/14* (2006.01)
*H04N 5/04* (2006.01)

(52) U.S. Cl.
CPC . *H04N 5/144* (2013.01); *H04N 5/04* (2013.01)
USPC .................................................... 375/240.16

(58) Field of Classification Search
CPC ................. H04N 5/144; H04N 5/04
USPC .................................................. 375/240.16
See application file for complete search history.

(56) References Cited

U.S. PATENT DOCUMENTS

2006/0274207 A1\* 12/2006 Hayden et al. ................ 348/572

\* cited by examiner

*Primary Examiner* — Richard Torrente
(74) *Attorney, Agent, or Firm* — Edell, Shapiro & Finnan, LLC

(57) ABSTRACT

An auto phase detection apparatus for automatically detecting a target sampling phase is provided. The auto phase detection apparatus includes a phase decider for generating a plurality of phase control signals; a sample clock generator, coupled to the phase decider, for generating a plurality of sample clock signals according to the phase control signals; an analog-to-digital converter (ADC), coupled to the sample clock generator, for converting an analog video signal to a digital signal according to the sample clock signals; a phase detector, coupled to the ADC and the phase decider, for generating a plurality of phase detection results according to the digital signal; and a motion detector, coupled to the ADC and the phase decider, for generating a motion detection result by detecting a motion in the digital signal. The phase decider determines the target sampling phase from the phase control signals according to the phase detection results and the motion detection result.

18 Claims, 5 Drawing Sheets

APPARATUS FOR AUTO PHASE DETECTION FOR VIDEO SIGNAL AND METHOD THEREOF

CROSS REFERENCE TO RELATED PATENT APPLICATION

This application claims the benefit of U.S. provisional patent application No. 61/236,893, filed Aug. 26, 2009, which is incorporated herein by reference in its entirety.

FIELD OF THE INVENTION

The present invention relates to phase detection, and more particularly to an apparatus for auto phase detection for video signals and method thereof.

BACKGROUND OF THE INVENTION

Digital image processing is extensively applied to display systems. However, before digital signals prevailed, analog signal transmission dominated the field of data transmission between two different system interfaces. In analog signal transmission, only a data wire is needed for data transmission. In contrast, for digital signal transmission between two digital system, important components namely a digital-to-analog converter (DAC) and an analog-to-digital converter (ADC) are required. Taking digital pixel data generated by a graphic card of a personal computer, for example, the digital pixel data is converted by a DAC to corresponding analog pixel data that is then transmitted to an ADC in a digital display device. The ADC then converts the received analog pixel data to the corresponding digital pixel data that is to be displayed.

In a video signal processing system, e.g., a conventional analog television or a digital television, an ADC is generally implemented for converting an analog signal to digital signals, which makes performance and accuracy of the ADC crucial factors for display quality. A sampling frequency at which the ADC samples analog signals is determined by a sampling clock signal. In a conventional video signal mode applied to a personal computer monitor, an approach for detecting a sampling phase and a sampling frequency of analog signals is established under the premise that an image frame displayed on the personal computer monitor is still. More specifically, when a particular video signal mode is applied in video playback, detection of sampling phase needs to take variations between image frames into consideration since image variations substantially affect accuracy in the detection of sampling frequency and sampling phase. It is to be noted that, the sampling frequency of all video signal modes of analog video signals is fixed as being regulated by video specifications in advance, whereas the sampling phase needs to be determined. Therefore, there is a need for an apparatus for phase detection of dynamic analog video signals.

SUMMARY OF THE INVENTION

The present invention provides an apparatus for auto phase detection for automatically detecting a target sampling phase. The apparatus for auto phase detection comprises: a phase decider, for generating a plurality of phase control signals; a sampling clock generator, coupled to the phase decider, for generating a plurality of sampling clock signals according to the phase control signals; an ADC, coupled to the sampling clock generator, for converting an analog signal to digital signals according to the sampling clock signals; a phase detector, coupled to the ADC and the phase decider, for generating a plurality of phase detection results according to the digital signals; and a motion detector, coupled to the ADC and the phase decider, for generating a motion detection result by detecting motions in the digital signals. Further, the phase decider determines the target sampling phase from the phase control signals according to the phase detection results and the motion detection result.

The present invention further provides a method for auto phase detection for automatically detecting a target sampling phase. The method for auto phase detection comprises: converting an analog signal to a digital signal according to a current sampling phase, detecting a motion in the digital signal to generate a motion detection result, and selectively performing phase detection to select the target sampling phase and updating the current sampling phase as the target sampling phase. Preferably, when the motion detection result is smaller than a first threshold, phase detection is performed to select the target sampling phase; when the motion detection result is smaller than a second threshold, the current sampling phase is updated as the target sampling phase.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
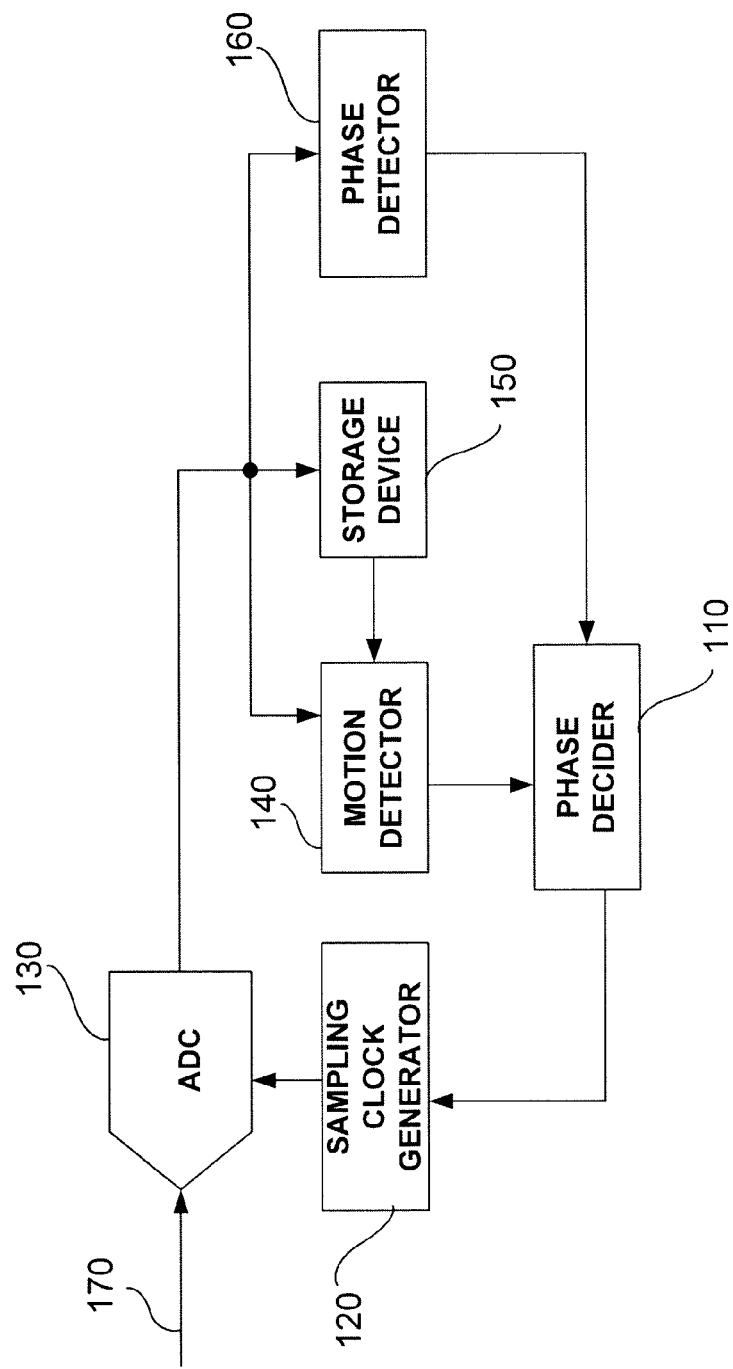
FIG. 1 is a block diagram of an apparatus for auto phase detection according to an embodiment of the invention.

FIG. 1 shows a block diagram of an auto phase detection apparatus 100 according to an embodiment of the invention. The auto phase detection apparatus 100 comprises a phase decider 110, a sampling clock generator 120, an analog-to-digital converter (ADC) 130, a motion detector 140, a storage device 150, and a phase detector 160. The ADC 130 receives an analog video signal 170. The phase decider 110 first generates a phase control signal to the sampling clock generator 120 so that the sampling clock generator 120 generates a sampling clock signal having a predetermined phase. Further, the frequency of sampling the clock signal is determined according to specifications of a video signal mode. The ADC 130 samples the analog video signal 170 according to the sampling clock signal to generate a digital signal, with the sampling frequency and sampling phase determined by the sampling clock signal. The motion detector 140 detects whether the digital signal is in motion to generate a motion detection result to the phase decider 110 to further determine whether motion exists in a currently displaying frame. For example, the storage device 150 receives and stores image data of one or two previous frames of the currently displaying frame, or image data of a plurality of frames at neighboring time points of the currently displaying frame. The motion detector 140 compares image data representing the digital signal with image data of the previous frames to generate a motion detection result to further determine whether there are variations among the frames. For example, when the motion detection result is smaller than a threshold TH1, the currently displaying frame is determined to be a still frame. Preferably, when the motion detection is smaller than a threshold and a time change rate is smaller than another threshold TH2, the currently displayed frame is determined to be a still frame. Preferably, the target sampling phase is considered reliable when the currently displayed frame stays still, and the phase decider 110 then generates a plurality of phase control signals in sequence to the sampling clock generator 120, which generates in sequence a plurality of sampling clock signals having different predetermined phases in response to the plurality of phase control signals. According to the sampling clock signals, the ADC 120 converts the analog video signal 170 to digital signals each being associated with a different predetermined phase from one another. Next, the phase detector 160 generates a plurality of phase detection results according to the digital signals, and the phase decider 110 determines an optimal sampling phase according to the phase detection results. With the availability of the optimal sampling phase, the phase decider 110 first determines whether a current motion detection result is still smaller than the threshold TH1 according to the predetermined phase adopted for the motion detection result, to further determine whether the currently display frame is changed. A motion detection result smaller than the threshold TH1 indicates that the currently displayed frame is not yet changed, and the phase decider 110 determines the optimal sampling phase as the target sampling phase that is then outputted to the sampling clock generator 120. In contrast, a motion detection result larger than the threshold TH1 indicates that the currently displayed frame contains changes, and the phase detection needs to be re-generated in which the phase decider 110 again generates a plurality of predetermined phases to determine the optimal sampling phase of the currently displayed frame.

Figure 2:
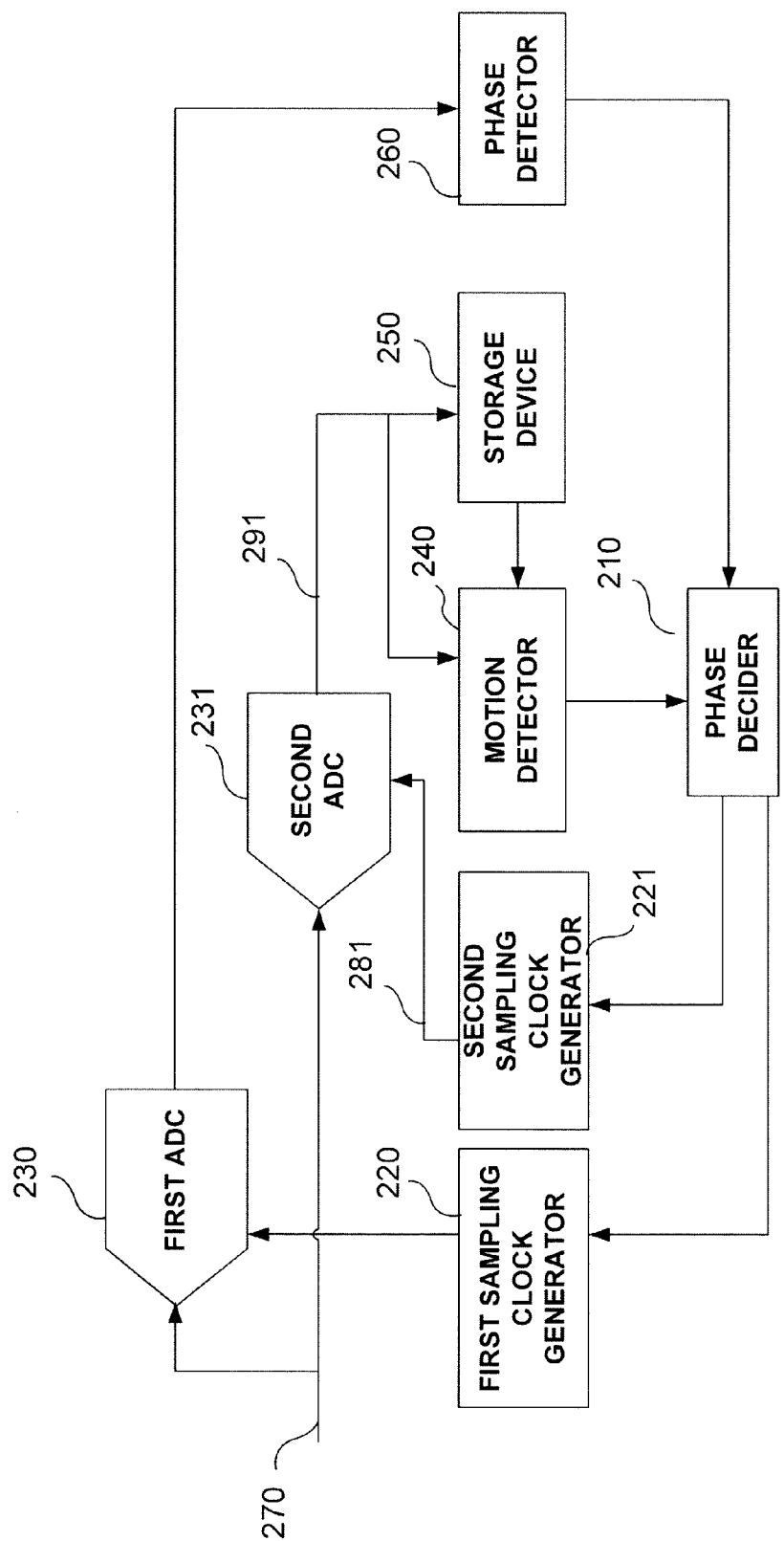
FIG. 2 is a block diagram of an apparatus for auto phase detection according to another embodiment of the invention.

FIG. 2 shows a block diagram of an auto phase detection apparatus 200 according to another embodiment of the invention. The auto phase detection apparatus 200 comprises a phase decider 210, a first sampling clock generator 220, a second sampling clock generator 221, a first ADC 230, a second ADC 231, a motion detector 240, a storage device 250, and a phase detector 260. The phase decider 210 generates a plurality of phase control signals for indicating a plurality of predetermined phases, according to which the first sampling clock generator 220 generates a plurality of first sampling clock signals respectively having the predetermined phases. According to the first sampling clock signals, the first ADC 230 converts the analog video signal 270 to a plurality of first digital signals for detecting an optimal sampling phase. It is to be noted that image data carried by the first digital signals are not displayed, i.e., the first ADC 230 is regarded as an off-line ADC. According to one of a plurality of phase control signals, the second clock generator 221 first generates a sampling clock signal 281, which has a frequency that is determined according to a video signal mode of the analog video signal 270. According to the second sampling clock signal 281, the second ADC 231 converts the analog video signal 270 to a second digital signal 291 to be displayed on a display, and outputs the second digital signal 291 to the motion detector 240 to detect whether the currently displayed frame contains motions.

The motion detector 240 detects whether the second digital signal 291 contains motions to generate a motion detection result that is outputted to the phase decider 210. The storage device 250 receives and stores image data of one or two previous frames of the currently displayed frame, or image data of a plurality of frames at neighboring time points of the currently displayed frame. For example, the motion detector 240 compares image data representing the present digital signal with image data of the previous frames to generate a motion detection result to further determine whether there are variations among the frames. For example, when the motion detection result is smaller than a threshold TH1, the currently displayed frame is determined to be a still frame. Preferably, when the motion detection is smaller than a threshold and a time change rate is smaller than another threshold TH2, the phase decider 210 determines the currently displayed frame to be a still frame and performs phase detection. For example, the phase decider 210 generates a plurality of phase control signals in sequence to the sampling clock generator 220. According to the phase control signals, the first ADC 230 converts the analog video signal 270 to a plurality of first digital signals each being associated with a sample with a different predetermined phase from one another. Next, the phase detector 260 generates a plurality of phase detection results according to the first digital signals, and the phase decider 210 determines an optimal predetermined sampling phase according to the phase detection results. During phase detection, the motion detector 240 detects motion in the image frame to generate a motion detection result. When the motion detection result indicates the existence of motion, preferably, when the motion detection result is greater than a threshold TH1 or when a time variation ratio is greater than another threshold TH2, the phase decider 210 halts the phase detection. When the motion detection result indicates that the image frame becomes still, the phase decider 210 then again performs phase detection.

In another embodiment, the motion detector 240 generates the motion detection result according to a motion difference between a field F(n) of a digital video signal and a field F(n-2) or F(n-1) at neighboring time points. When odd and even fields are interlaced, i.e., when odd fields and even fields are alternately presented, an absolute difference between the field F(n) and the field F(n-2) is adopted as a difference between scan lines at neighboring time points to represent a difference between odd scan lines or between corresponding even scan lines. Alternatively, an absolute difference between the field F(n) and the field F(n-1) is adopted to represent an image difference of scan lines at neighboring time points.

Figure 3:
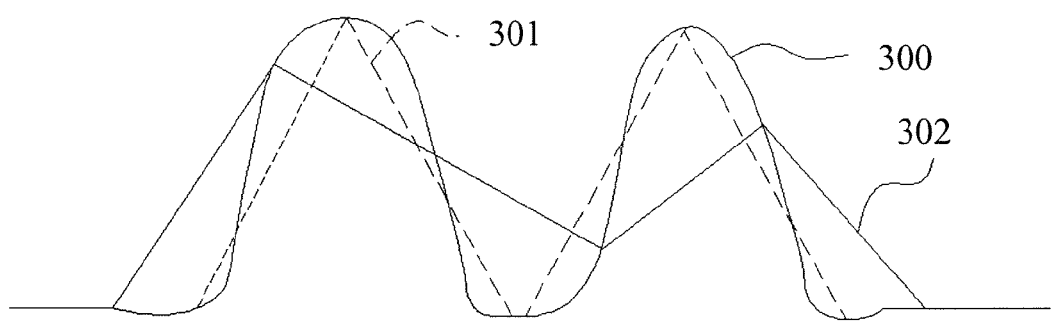
FIG. 3 is a schematic diagram of phase detection applied to a phase detector according to one embodiment of the invention.

FIG. 3 shows a schematic diagram of phase detection applied to the phase detector 260 according to one embodiment of the invention. A curve 300 represents an analog video signal, and curves 301 and 302 represent adapted curves from sampling the analog video signal curve 300 by using sampling clock signals having different predetermined phases. Each of the adapted curves 301 and 302 may correspond to a digital signal. Since turning points of the analog video signal curve 300 carries information necessary for displaying fields, it is desired to obtain information at the turning points by sampling and the acquired information can then be converted to digital signals. A distinction between the curves 301 and 302 is that, the turning points of the adaptive curve 301 exactly match sampling points, whereas turning points of the adapted curve 302 do not. The phase detector 260 in FIG. 2 may adopt a phase detection algorithm to respectively calculate phase detection results of the digital signals. For example, a score is adopted to represent the phase detection results; and the algorithm is a calculation for a sum of polarity change in slopes of an adapted curve. The sum gets larger as closer a sampling point gets to the turning point, thus, a higher score is given. Therefore, the curve 301 has a score greater than that of the curve 302, and the phase decider 210 selects the optimal sampling phase according to the score.

Figure 4:
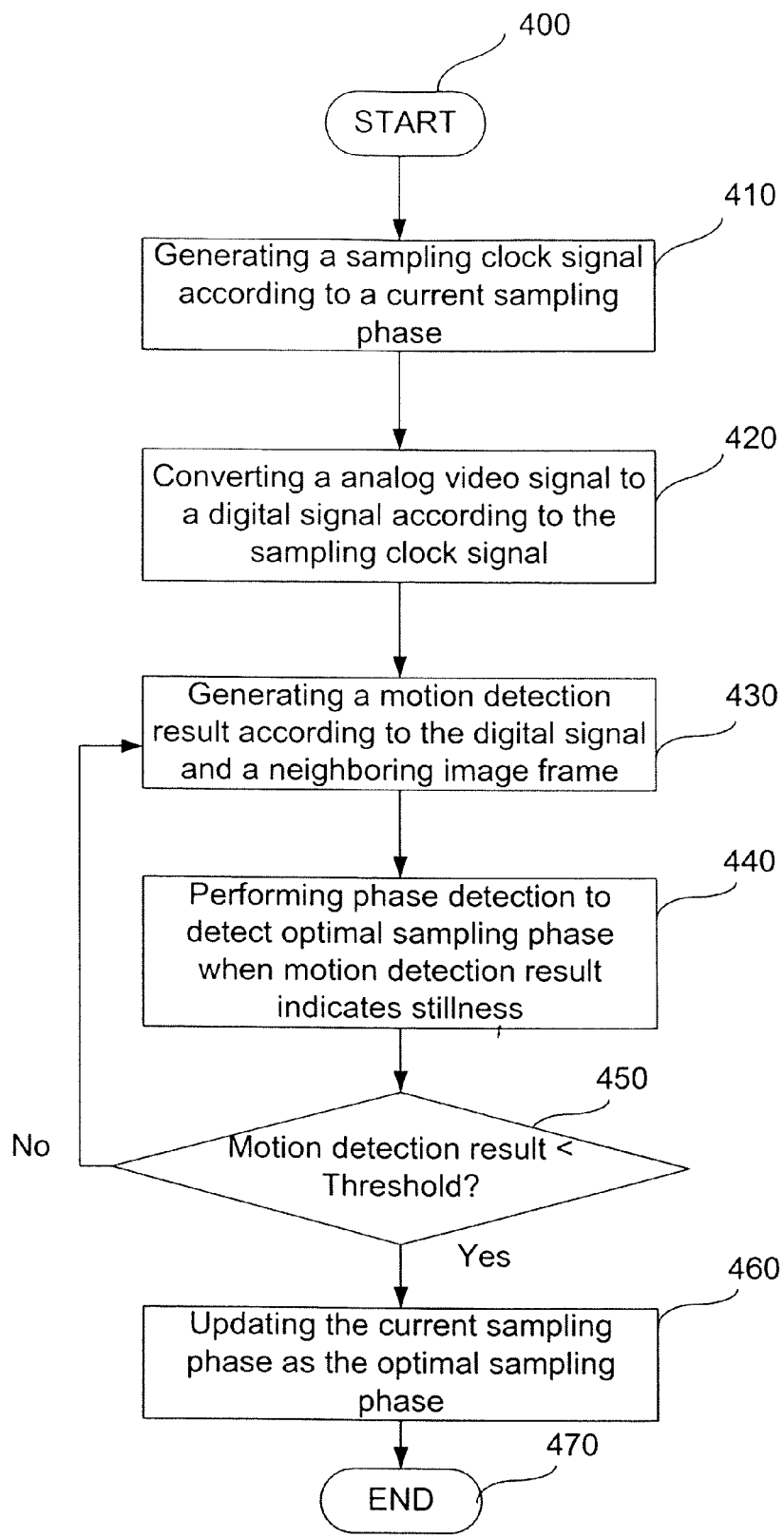
FIG. 4 is a flowchart of a method for auto phase detection according to an embodiment of the invention.

FIG. 4 shows a flowchart of a method for auto phase detection according to one embodiment of the invention. The flow begins with Step 400. In Step 410, a sampling clock signal is generated according to a current sampling phase, with a frequency of the sampling clock signal being determined by a video signal mode. In Step 420, an analog video signal is converted to a digital video signal according to the sampling clock signal. In Step 430, a motion detection result is generated according to the digital signal and a neighboring image frame. For example, a motion detection result is generated according to a motion difference between a field F(n) of the digital video signal and a field F(n-2) or F(n-1) at neighboring time points. When odd and even fields are interlaced, i.e., when odd fields and even fields are alternately presented, an absolute difference between the field F(n) and the field F(n-2) is adopted as a difference between scan lines at neighboring time points to represent a difference between odd scan lines or corresponding even scan lines. Alternatively, an absolute difference between the field F(n) and the field F(n-1) is adopted to represent an image difference of scan lines at neighboring time points. In Step 440, phase detection is selectively performed. More specifically, phase detection is performed to determine an optimal sampling phase when the motion detection result indicates stillness. For example, when the motion detection result is smaller than a threshold TH1, or preferably when the motion detection result is smaller than a threshold TH1 and a time variance ratio is smaller than another threshold TH2, it is determined that the motion detection result indicates stillness. The flow of performing phase detection is to be illustrated with reference to FIG. 5 shortly. In Step 450, after determining the optimal sampling phase, it is determined whether the motion detection result continues to indicate stillness. Step 460 is performed to update the current sampling phase as the optimal sampling phase when a result from Step 450 is affirmative; or else Step 430 is iterated when the result from Step 450 is negative. Alternatively, when the motion detection result indicates the existence of motion, phase detection is halted to iterate Step 430. The flow ends at Step 470.

Figure 5:
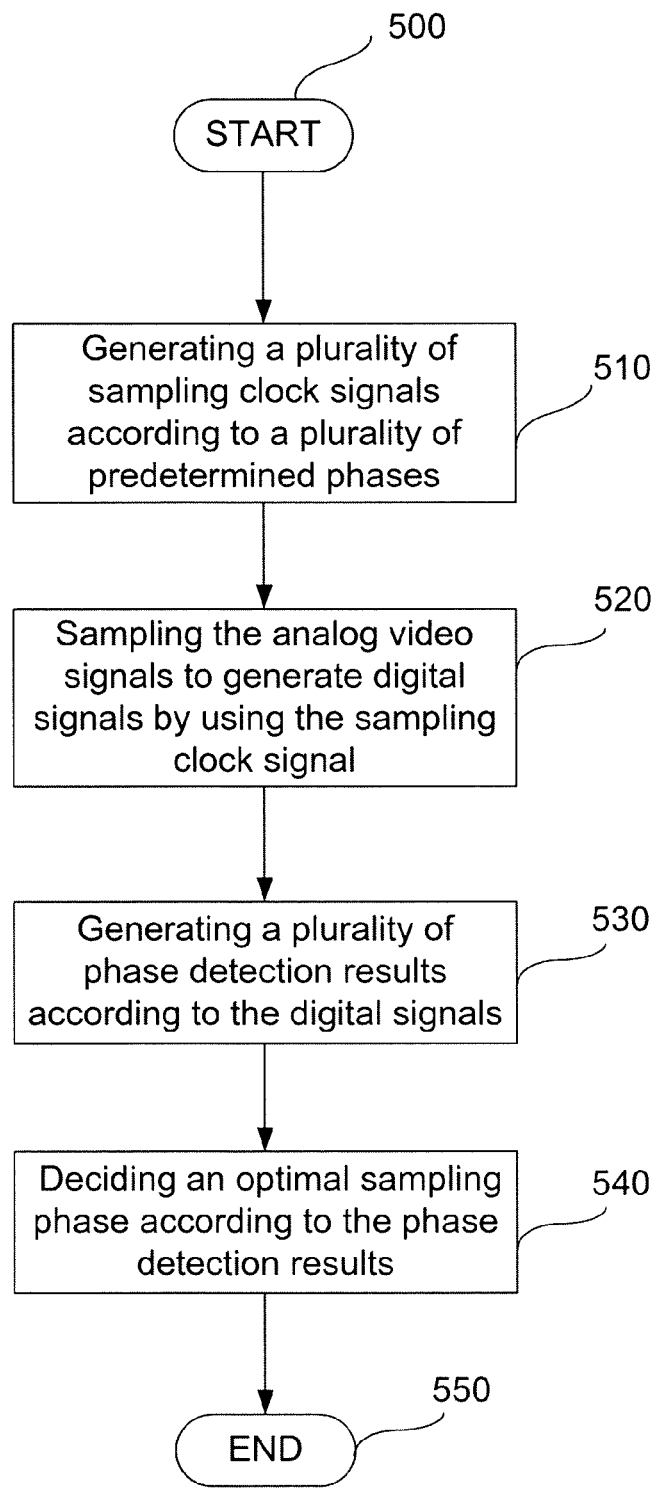
FIG. 5 is a flowchart of phase detection according to an embodiment of the invention.

FIG. 5 shows a flowchart of phase detection according to one embodiment of the invention. The flow begins with Step 500. In Step 510, a plurality of sampling clock signals are generated according to a plurality of predetermined phases. In Step 520, an analog video signal is sampled according to the sampling clock signals to generate a plurality of digital signals. In Step 530, a plurality of phase detection results are generated according to the digital signals. For example, a score is adopted to represent the phase detection results; and the algorithm is a calculation for a sum of polarity change in slopes of an adapted curve, and the sum gets larger as closer a sampling point gets to a turning point and is thus given a higher score. In Step 540, an optimal sampling phase is determined according to the phase detection results. For example, a predetermined phase with the highest score is selected as the optimal sampling phase. The flow ends at Step 550.

The foregoing describes an apparatus for auto phase detection for automatically detecting a target sampling phase. The apparatus for auto phase detection comprises: a phase decider, for generating a plurality of phase control signals; a sampling clock generator, coupled to the phase decider, for generating a plurality of sampling clock signals according to the phase control signals; an ADC, coupled to the sampling clock generator, for converting an analog signal to digital signals according to the sampling clock signals; a phase detector, coupled to the ADC and the phase decider, for generating a plurality of phase detection results according to the digital signals; and a motion detector, coupled to the ADC and the phase decider, for generating a motion detection result by detecting motions in the digital signals. Further, the phase decider determines the target sampling phase from the phase control signals according to the phase detection results and the motion detection result.

The foregoing also describes a method for auto phase detection for automatically detecting a target sampling phase. The method for auto phase detection comprises: converting an analog signal to a digital signal according to a current sampling phase, detecting a motion in the digital signal to generate a motion detection result, and selectively performing phase detection to select the target sampling phase and updating the current sampling phase as the target sampling phase. Preferably, when the motion detection result is smaller than a first threshold, phase detection is performed to select the target sampling phase; when the motion detection result is smaller than a second threshold, the current sampling phase is updated as the target sampling phase.

While the invention has been described in terms of what is presently considered to be the most practical and preferred embodiments, it is to be understood that the invention need not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An apparatus for auto phase detection, for automatically detecting a target sampling phase for a video signal, the apparatus comprising:
   a phase decider, for generating a plurality of phase control signals;
   a sampling clock generator, coupled to the phase decider, for generating a plurality of sampling clock signals according to the phase control signals;
   an analog-to-digital converter (ADC), coupled to the sampling clock generator, for converting the video signal to a digital video signal according to the sampling clock signals;
   a phase detector, coupled to the ADC and the phase decider, for generating a plurality of phase detection results according to the digital video signal; and
   a motion detector, coupled to the ADC and the phase decider, for generating a motion detection result by detecting motion in the digital video signal;
   wherein the phase decider determines the target sampling phase from the phase control signals according to the phase detection results and the motion detection result,
   wherein the phase decider halts operation when the motion detection result indicates the existence of motion,
   wherein the phase detector is configured to generate a plurality of phase detection results according to a plurality of predetermined phases, and determine the target sampling phase from the predetermined phases; and
   wherein the phase detector is further configured to selectively update a current sampling phase as the target sampling phase according to the motion detection result.

2. The apparatus as claimed in claim 1, wherein when the motion detection result indicates that a current image frame is still, the phase decider updates the current sampling phase of the phase control signals as the target sampling phase.

3. The apparatus as claimed in claim 2, wherein the current image frame is still when the motion detection result is smaller than a threshold.

4. The apparatus as claimed in claim 2, wherein the current image is in motion when the motion detection result exceeds a threshold.

5. An apparatus for auto phase detection, comprising:
a phase decider, for generating a plurality of phase control signals;
a first sampling clock generator, coupled to the phase decider, for generating a plurality of first sampling clock signals according to the phase control signals;
a second sampling clock generator, coupled to the phase decider, for generating a second sampling clock according to a current sampling phase;
a first ADC, coupled to the first sampling clock generator, for converting an analog video signal to a first digital signal according to the first sampling clock signals;
a second ADC, coupled to the second sampling clock generator, for converting the analog video signal to a second digital signal according to the second sampling clock signal;
a phase detector, coupled to the first ADC and the phase decider, for generating a plurality of phase detection results to the phase decider according to the first digital signal; and
a motion detector, coupled to the second ADC and the phase decider, for generating a motion detection result to the phase decider by detecting motion in the second digital signal;
wherein the phase decider determines a target sampling phase from the phase control signals according to the phase detection results and the motion detection result, and updates the current sampling phase as the target sampling phase,
wherein the phase decider halts operation when the motion detection result indicates the existence of motion,
wherein the phase detector is configured to generate a plurality of phase detection results according to a plurality of predetermined phases, and determine the target sampling phase from the predetermined phases; and
wherein the phase detector is further configured to selectively update the current sampling phase as the target sampling phase according to the motion detection result.

6. The apparatus as claimed in claim 5, wherein when the motion detection result indicates that a current image frame is still, the phase decider updates the current sampling phase from the phase control signals as the target sampling phase.

7. The apparatus as claimed in claim 5, wherein the current image frame is still when the motion detection result is smaller than a threshold.

8. The apparatus as claimed in claim 5, wherein the current image is in motion when the motion detection result exceeds a threshold.

9. An auto phase detection method for converting an analog video signal to a digital signal, the method comprising:
converting the analog video signal to the digital signal according to a current sampling phase;
detecting motion in the digital signal to generate a motion detection result; and
selectively performing phase detection according to the motion detection result to determine a target sampling phase so as to update the current sampling phase as the target sampling phase,
wherein the step of selectively performing phase detection performs phase detection when the motion detection result indicates stillness to update the current sampling phase as the target sampling phase, and
wherein the step of phase detection is halted when the motion detection result indicates the existence of motion,
wherein the step of selectively performing phase detection comprises:
generating a plurality of phase detection results according to a plurality of predetermined phases, and determining the target sampling phase from the predetermined phases; and
selectively updating the current sampling phase as the target sampling phase according to the motion detection result.

10. The method as claimed in claim 9, wherein the step of converting analog video signal to the digital signal comprises:
generating a sampling clock signal according to the current sampling phase; and
converting the analog video signal to the digital signal according to the sampling clock signal.

11. The method as claimed in claim 9, wherein the step of determining the target sampling phase comprises:
converting the analog video signal to the digital signal according to the predetermine phases; and
determining the target sampling phase according to the digital signal.

12. The method as claimed in claim 9, wherein the step of determining the target sampling phase comprises:
generating a plurality of sampling clock signals according to the predetermined phases;
converting the analog video signal to the digital signal according to the sampling clock signals; and
determining the target sampling signal according to the digital signal.

13. The method as claimed in claim 9, wherein the step of determining the target sampling phase comprises:
generating a plurality of phase detection results according to the digital signal; and
determining the target sampling phase from the predetermined phases according to the phase detection results.

14. The method as claimed in claim 9, wherein the step of selectively performing phase detection performs phase detection when the motion detection result indicates stillness.

15. The method as claimed in claim 9, wherein the step of selectively performing phase detection updates the current sampling phase as the target sampling phase when the motion detection result continues to indicate stillness.

16. The method as claimed in claim 15, wherein the current image frame is still when the motion detection result is smaller than a threshold.

17. The method as claimed in claim 16, wherein the current image frame is in motion when the motion detection result exceeds the threshold.

18. The method as claimed in claim 9, wherein the step of selectively performing phase detection comprises:
performing phase detection when the motion detection result is smaller than a first threshold; and
updating the current sampling phase as the target sampling phase when the motion detection result is smaller than a second threshold.

* * * * *